United States Patent
Windprechtinger et al.

(10) Patent No.: US 9,597,799 B2
(45) Date of Patent: Mar. 21, 2017

(54) METHOD AND DEVICE FOR MACHINING ROBOT-GUIDED COMPONENTS

(75) Inventors: Joerg Windprechtinger, Munich (DE); Daniel Hodel, Gysenstein (CH)

(73) Assignee: MTU Aero Engines AG, Munich (DE)

( * ) Notice: Subject to any disclaimer, the term of this patent is extended or adjusted under 35 U.S.C. 154(b) by 578 days.

(21) Appl. No.: 13/881,703

(22) PCT Filed: Oct. 26, 2011

(86) PCT No.: PCT/EP2011/005402
§ 371 (c)(1),
(2), (4) Date: Oct. 8, 2013

(87) PCT Pub. No.: WO2012/055552
PCT Pub. Date: May 3, 2012

(65) Prior Publication Data
US 2014/0143991 A1 May 29, 2014

(30) Foreign Application Priority Data

Oct. 26, 2010 (EP) .................................... 10013991

(51) Int. Cl.
| | |
|---|---|
| B25J 9/16 | (2006.01) |
| B25J 9/00 | (2006.01) |
| B24B 19/14 | (2006.01) |
| B24B 41/06 | (2012.01) |
| B25J 11/00 | (2006.01) |
| B23P 15/02 | (2006.01) |

(52) U.S. Cl.
CPC .............. *B25J 9/1638* (2013.01); *B24B 19/14* (2013.01); *B24B 41/06* (2013.01); *B25J 9/0096* (2013.01); *B25J 11/0065* (2013.01); *B23P 15/02* (2013.01); *F05D 2230/10* (2013.01); *Y10T 29/37* (2015.01); *Y10T 29/49336* (2015.01); *Y10T 29/49769* (2015.01); *Y10T 29/49771* (2015.01)

(58) Field of Classification Search
CPC ........... B23P 6/002; B23P 15/02; B23P 15/04; B23Q 17/003; B23Q 17/22; B23Q 17/2233; B23Q 17/2424; F05D 2230/10; B25J 9/0096; B25J 11/0065; B24B 19/14; Y10T 29/49336; Y10T 29/49995
See application file for complete search history.

(56) References Cited

U.S. PATENT DOCUMENTS 5,193,314 A * 3/1993 Wormley ................ B24B 19/14
451/11
2009/0214312 A1 8/2009 Geisel

FOREIGN PATENT DOCUMENTS

| | | |
|---|---|---|
| DE | 44 24 167 A1 | 1/1996 |
| DE | 103 22 396 A1 | 11/2004 |

(Continued)

OTHER PUBLICATIONS

European Search Report, dated Mar. 25, 2011, 5 pages.
PCT/ISA/210 PCT/EP2011/005402, dated Nov. 29, 2011, 2 pages.

*Primary Examiner* — Christopher Besler
(74) *Attorney, Agent, or Firm* — Crowell & Moring LLP

(57) ABSTRACT

A method for machining a robot-guided component with a tool which is fastened in an articulated manner to a tool holder is disclosed. The method includes detecting a deflection of the tool with respect to the tool holder from a desired position and changing a pose of a robot that is guiding the robot-guided component on a basis of the detected deflection.

15 Claims, 1 Drawing Sheet

(56) References Cited

FOREIGN PATENT DOCUMENTS

| DE | 10 2008 010 983 A1 | 8/2009 |
|---|---|---|
| EP | 2 014 413 A1 | 1/2009 |
| JP | 2002-301659 A | 10/2002 |

\* cited by examiner

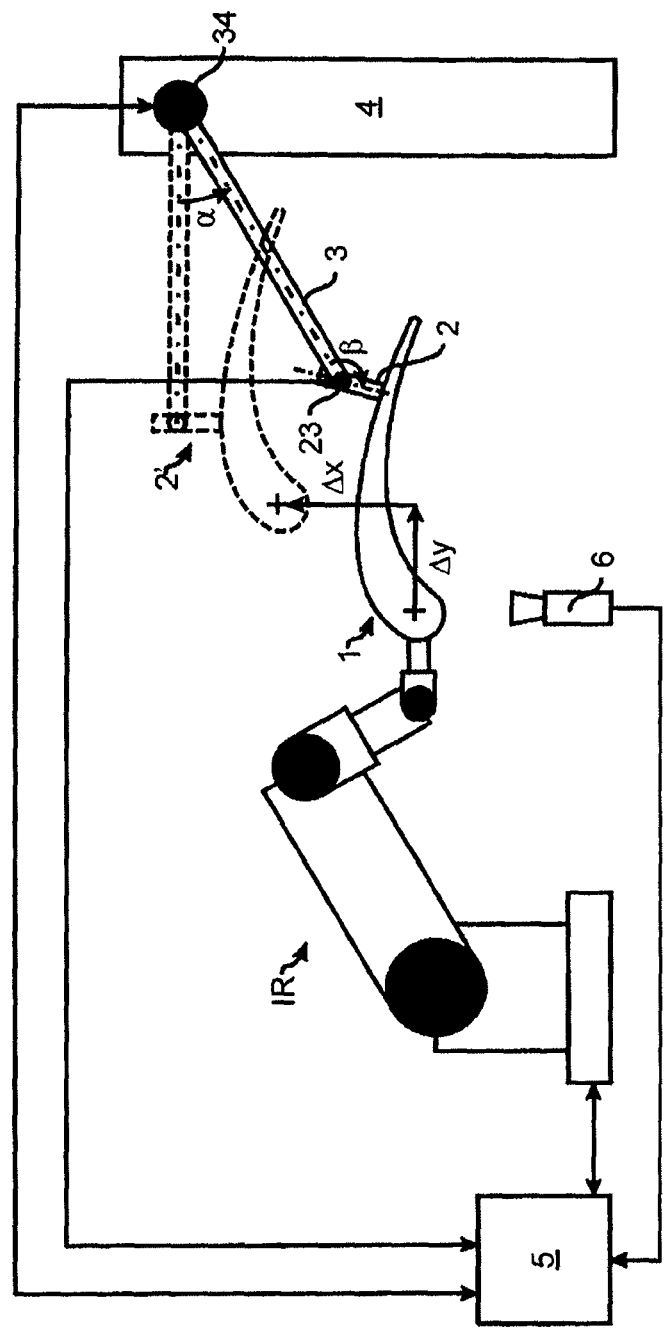

METHOD AND DEVICE FOR MACHINING ROBOT-GUIDED COMPONENTS

This application claims the priority of International Application No. PCT/EP2011/005402, filed Oct. 26, 2011, and European Patent Document No. 10013991.4, filed Oct. 26, 2010, the disclosures of which are expressly incorporated by reference herein.

BACKGROUND AND SUMMARY OF THE INVENTION

The invention relates to a method and a device for machining robot-guided components, in particular turbine blades.

A method is known from European Patent Document No. EP 2 014 413 A1. In this case, a robot guides individual compressor blades to one or multiple grinding machines in order to restore an optimized leading edge contour. A sensor on a grinding disk detects a contact pressure that the robot-guided blades exert on the grinding disk. This force measured value is able to be taken into consideration in the movement process of the robot in order to compensate for component tolerances. EP 2 014 413 A1 does not disclose how the measured value in the movement process is taken into consideration.

The object of the present invention is improving the machining of robot-guided components.

The present invention may be used in particular for machining turbine blades, for example guide blades or rotor blades of compressors, compressor stage(s) or turbine (stages) of aircraft engines, wherein preferably a plurality of blades connected to one another, for example integrally bladed rotors (blisk), a complete guide vane assembly or rotor assembly or a portion of such an assembly may be handled by a robot. The machining may take place in particular during the new manufacture or a repair of the blade(s).

According to the invention, a component, for example a blade, is guided by at least one robot to at least one tool which machines the component in the process. Components may also be advantageously guided by the same robot or, in particular selectively, for instance depending upon the component and/or tool, by different robots to the same tool, selectively to, for example differently configured tools or tools replacing one another and/or in succession to different tools. Tools machine the component preferably in a rotating manner and/or under the application of a specific contact force, for instance in a metal-cutting manner, by grinding, polishing or the like.

For example, a robot may pick up rotor blades or a rotor blade disk (blisk) and guide them to a grinding station on a grinding disk. Then the same or another robot may guide the same component to a polishing station on a polishing disk. In the meantime, a further robot may already guide another blade (disk) to the grinding disk so that the grinding disk is utilized in an optimal manner and the throughput is increased. Similarly, heavier blades or blade disks, for example, may be guided by more powerful robots to the same tool. In addition a plurality of the same kind of machining stations may also be provided in order to substitute for one another, for instance during replacement of a grinding disk or the like, so that the robot(s) are better utilized.

One or a plurality of the tools is fastened in an articulated manner to the same or different, moveable or stationary tool holders. In a preferred embodiment, a tool in this case has at least one, in particular at least two and preferably three or more degrees of freedom, in particular rotational degrees of freedom, the coordinates of which are detected for detecting a deflection of the tools fastened in an articulated manner with respect to the tool holder.

A rotational degree of freedom is preferably realized by a pivot joint with an axis. Two or more rotational degrees of freedom may be realized by a pivot joint with the corresponding number of axes, for instance ball joints or Cardan joints, or, preferably, by one or multiple coupling elements, wherein then the tool or a tool receptacle is fastened by a, preferably single-axis, pivot joint to a coupling element, for example an extension arm, and the coupling element for its part by an, again preferably single-axis, pivot joint to the tool carrier or a further coupling element, which for its part is then fastened to the tool carrier, if need be with the interconnection of additional coupling elements and pivot joints. Translational joints, for instance rail guides or the like may be provided instead of some or all of the pivot joints. Two or more axes of the articulated fastening, in particular axes of rotation of pivot joints, are preferably parallel to one another. The articulated fastening of the tool to the tool carrier may feature a tool receptacle connected in an articulated manner to the tool holder in particular for detachably fastening one or various tools, extension arms, joints, and guides such as for example sliding block guides and/or prestressing elements, for instance springs, for specifying target positions.

According to the invention, a deflection of the tool with respect to the tool holder from a desired position because of a guidance of a component to the tool is detected and a pose of the robot that is guiding this component is changed on the basis of this deflection. In particular, a pose of the robot may be changed on the basis of the detected deflection of the tool in such a way that this deflection is compensated for completely or at least substantially, i.e., the tool is situated at least approximately in its desired position.

A machining position of the component relative to the tool is determined by the linkage of the component to the robot, the linkage being realized for example by a gripper; by the pose of the robot, which is defined by the position of the joints thereof, for instance the angular positions of the pivot joints of a six-axis industrial robot; by the preferably unchanging position of a robot base relative to the tool holder; and by the position of the tool relative to the tool holder that is changeable due to the articulated fastening.

In this case, one or a plurality of machining positions to be approached in succession, for instance for guidance of the component to the tool in such a way that the tool follows a predetermined machining path on the component, for example a grinding pattern, are specified for target values in particular of the component and corresponding poses of the robot are saved, for example taught or programmed offline.

If a component to be machined then deviates from the target values that formed the basis of the specifications, for instance because of manufacturing tolerances, and/or the linkage thereof to the robot deviates from target values, for example due to handling tolerances during gripping by the robot, this produces a deflection of the tool with respect to the tool holder by the robot-guided component. As a consequence, the relative position between the tool and the component changes so that the machining also deviates from specifications in an undesired manner.

Due to the fact that, according to the invention, this deflection is detected and the pose of the robot is changed on the basis of this deflection, it is possible for the deflection to be compensated for, in particular reduced or eliminated so that the component is again in the desired position relative to the tool and is therefore correctly machined by the tool.

In a preferred embodiment, a robot moves a component to be machined, in particular in a translational manner, preferably in a plane perpendicular to at least one axis of rotation of a pivot joint of the articulated fastening of the tool to the tool holder, towards the tool holder in order to compensate for the deflection. Such a translational movement advantageously prevents changes in the orientation of the component with respect to the tool.

The tool is preferably prestressed against a component to be machined. On the one hand, this may cause a yielding of the tool with an increase in this prestress in order to prevent damaging a component in an actual position that deviates from the desired position. In addition, in the case of actual positions that deviate from the desired position in different, in particular opposite, directions, it may advantageously produce a respective deflection, which may be compensated for according to the invention by a corresponding pose change of the robot.

Such a prestress may be realized for example by gravitation, for instance by an articulated suspension in such a way that the tool is raised in the desired position in an articulated manner against the force of gravity, and/or elastically, for example by one or a plurality of springs, which act in one or more, preferably all, degrees of freedom of the articulated fastening of the tool to the tool holder. In addition or as an alternative, a component to be machined may be prestressed actively or in a controlled manner, in particular, in that one or a plurality of forces and/or torques, which act between the component and the tool and/or between the tool and the tool holder, are detected and correspondingly triggered actuators, for example electric motors, are triggered in such a way that the detected actual forces or actual torques approach or reach predetermined force or torques values, which are predetermined for example for the force-closed machining of the component.

In a preferred embodiment a surface condition, in particular a surface structure, of a component to be machined, is detected, in particular by means of an optical detection means, which may preferably have an image processing. A machining process may then be predetermined on the basis of this detected surface condition. For example, a suitable machining path, a suitable machining tool, for instance a grinding granularity, a suitable machining time, a suitable contact force between the component and tool, suitable, for instance raised and/or rough, machining regions and the like may be predetermined. In particular, an actual surface condition may be detected and compared to a target surface condition and a decision may be made whether a machining of this component is carried out at all, because for example the desired target surface condition is already present or is not able to be achieved with the tool, and/or whether a machining of the component, for example a grinding down, is repeated, because the desired target surface condition has not yet been achieved.

Additional features and advantages are yielded from the subordinate claims and the exemplary embodiment. To this end, a single FIGURE in partly schematized form shows the following.

BRIEF DESCRIPTION OF THE DRAWING

FIG. 1 illustrates the machining of a turbine blade in a device according to an embodiment of the present invention.

DETAILED DESCRIPTION OF THE DRAWING

FIG. 1 shows a turbine blade 1, which is being guided by a six-axis jointed-arm robot IR to a tool 2.

The tool is fastened so that it is free to rotate in a first pivot joint 23 on an extension arm 3, the position thereof relative to the extension arm being described by the mathematically negative angle β, which indicates the deflection with respect to a target position indicated by a dashed line in FIG. 1. In other words, for β=0, the tool is in the undeflected position with respect to the extension arm indicated by a dashed line in FIG. 1, in which position a tool axis is aligned perpendicularly to the extension arm 3.

For its part, the extension arm 3 is fastened so that it is free to rotate in a second pivot joint 34 on an inertially fixed tool holder 4, the position thereof relative to the tool holder being described by the mathematically positive angle α, which indicates the deflection with respect to a target position indicated by a dashed line in FIG. 1. In other words, for α=0, the extension arm 3 is in the undeflected position with respect to the tool holder 4 indicated by a dashed line in FIG. 1, in which position an extension arm axis is aligned horizontally.

The axes of rotation of the first and second pivot joints are parallel to one another and are perpendicular on the plane of projection of FIG. 1. Therefore, the tool 2, which may be a grinding tool for example, in particular a grinding disk rotating around the tool axis indicated by a dashed-and-dotted line, is fastened in an articulated manner to the tool holder 4, the deflection thereof with respect to the tool holder 4 from the desired position being described by the angles (α, β).

Acting in the joints 23, 34 are electric motors which are indicated by solid circles in FIG. 1. Rotary encoders, for example resolvers or incremental encoders, detect the angles (α, β) and transmit them to a control device 5. In addition, torque sensors are provided, which detect the torques around the axes of rotation of the joints 23, 34 and likewise transmit them to the control device 5.

The control device 5 triggers the electric motors in the joints 23, 34 on the basis of the detected actual torques in such a way that the electric motors approach the predetermined target torques, in that they output control variables for example, which are proportional to the difference between the target torque and actual torque in the pivot joint, on which the electric motor acts, or the difference between the target force and actual force between the blade 1 and the tool 2. In this way, the tool 2 is prestressed actively or in a regulated manner against the blade 1. Purely as an example, the target torque in the pivot joint 34 may for example correspond to the product of the length of the extension arm 3, on the one hand, and, on the other hand, to the target process force with which the grinding tool is supposed to be pressed on the blade 1 during grinding, minus the weight force of the extension arm and tool. Similarly, springs may also be provided for example, which act on the pivot joints 23, 34 and, supported by gravitational force, passively prestress the tool 2 against the blade 1.

The control device 5 controls the robot IR by comparing the detected actual positions of its joints or motors with target positions which were taught in advance and describe the target pose of the robot IR.

If the position of the tool 2 now deviates from the desired position 2', for example due to manufacturing-related tolerances of the blade 1 or a deviating gripping position of the robot IR, then the tool 2, which, due to the force regulation in the electric motors of the joints 23, 34 is nevertheless prestressed against the blade and supports itself on the blade, features a deflection α, β≠0 (depicted as a solid line in FIG. 1) against the desired position indicated by a dashed line in FIG. 1, which is detected by the rotary encoders in the joints 23, 34 and transmitted to the control device 5.

The control device now controls the robot IR such that it displaces the blade 1 translationally in the plane of projection of FIG. 1 in the x-y direction depicted there around Δx, Δy until the deflection is compensated for—at least approximately—i.e., α, β≈0 or α, β=0. In doing so, the controller 5 displaces the blade 1 by means of the robot IR so long in the x-direction until the deflection α of the tool 2 with respect to the extension arm 3 is compensated for, and at the same time or sequentially to this so long in the y-direction until the deflection β of the extension arm 3 with respect to the tool holder 4 is compensated for without changing the orientation of the blade 1.

In this way, the blade 1 is able to be machined by the grinding tool 2 in the desired position 2' with the predetermined inclination angle and contact pressure of the tool.

FIG. 1 also depicts an optical detection means in the form of a camera 6 having image processing, which transmits the information to the control device 5. Based on the analysis of the surface condition of the blade 1 detected by the camera 6, the control device specifies an individually adapted machining. For example, regions of the blade 1 to be machined may thereby be specified and/or the machining result may be examined and, if need be, a post-machining is initiated with repeated machining with the same or another tool.

LIST OF REFERENCE NUMBERS

1 Turbine blade (component)
2(') Tool (undeflected desired position)
3 Extension arm (articulated fastening)
4 Tool holder
5 Control device
6 Camera
23 Pivot joint between 2 and 3 (articulated fastening)
34 Pivot joint between 3 and 4 (articulated fastening)
IR Robot
α, β Deflection

The invention claimed is:

1. A method for machining a robot-guided component, comprising:
    detecting a change in position of a tool with respect to a tool holder from a desired position wherein the tool is fastened in an articulated manner to the tool holder via an extension arm; and
    changing a pose of a robot that is guiding the robot-guided component on a basis of the detected change in position;
    wherein the changing the pose of the robot guides the robot-guided component in a first direction against the tool holder to compensate for the detected change in position in a first degree of freedom and guides the robot-guided component in a second direction against the tool holder to compensate for the detected change in position in a second degree of freedom.

2. The method according to claim 1, wherein the tool has a plurality of degrees of freedom and wherein the detecting the change in position includes detecting coordinates of the plurality of degrees of freedom.

3. The method according to claim 2, wherein the plurality of degrees of freedom are rotational degrees of freedom.

4. The method according to claim 1, wherein the changing the pose of the robot compensates for the detected change in position at least substantially.

5. The method according to claim 1, wherein the changing the pose of the robot guides the robot-guided component translationally against the tool holder.

6. The method according to claim 1, further comprising prestressing the tool against the robot-guided component.

7. The method according to claim 6, wherein the prestressing is a controlled prestressing or a passive prestressing.

8. The method according to claim 7, wherein the controlled prestressing is force-controlled or torque-controlled.

9. The method according to claim 7, wherein the passive prestressing includes applying a gravitational force.

10. The method according to claim 1, further comprising guiding the robot-guided component selectively or in succession to a plurality of tools by the robot or a plurality of robots.

11. The method according to claim 1, further comprising guiding the robot-guided component or a plurality of robot-guided components selectively or in succession by a second robot.

12. The method according to claim 1, further comprising detecting a surface condition of the robot-guided component and predetermining a machining process on a basis of the detected surface condition.

13. The method according to claim 12, wherein the detecting the surface condition includes optically detecting the surface condition.

14. The method according to claim 1, wherein the robot-guided component is a turbine blade.

15. The method according to claim 1, wherein during the changing the pose of the robot, an orientation of the robot-guided component is not changed.

* * * * *